US005785760A

United States Patent [19]

Sconyers et al.

[11] Patent Number: 5,785,760

[45] Date of Patent: Jul. 28, 1998

[54] LINE STRIPING MACHINE

[75] Inventors: John Ross Sconyers; Robert A. Mallory, Jr., both of Nashville, Tenn.

[73] Assignee: TechLiner Products & Equipment, Inc., Nashville, Tenn.

[21] Appl. No.: 640,285

[22] Filed: Apr. 4, 1996

[51] Int. Cl.$^6$ .............................. B05C 11/00; B05B 1/24; B60H 3/00

[52] U.S. Cl. .......................... 148/600; 118/300; 118/302; 239/130; 239/139; 222/146.2; 137/340; 137/341; 165/42; 165/43

[58] Field of Search ................................ 404/94, 95, 101, 404/111; 239/150, 155, 156, 157, 148, 147, 128, 130, 139; 118/300, 302, 600; 165/42, 43; 222/146.2; 137/340, 341

[56] References Cited

U.S. PATENT DOCUMENTS 4,462,547 7/1984 Metz ........................................ 404/94

4,887,908 12/1989 Montgomery et al. ................. 366/149

FOREIGN PATENT DOCUMENTS 4219876 12/1992 Germany .

7082714 3/1995 Japan .

*Primary Examiner*—Donald E. Czaja

*Assistant Examiner*—Calvin Padgett

*Attorney, Agent, or Firm*—Luedeka, Neely & Graham, P.C.

[57] ABSTRACT

A self propelled, walk-behind or surrey drawn striping machine includes a single fluid tank for confining and, delivering under a pressure, fluid drive, heated thermoplastic, paint and the new, environmentally preferred, thin line thermoplastic. The machine is propelled by hydraulic wheel motors. A primary material tank comprises a pressurized interior vessel that is substantially surrounded by a heating fluid circulation jacket. A third wall around the fluid circulation jacket provides a heat riser insulating space. Combustion products from a burner head below the circulation jacket rise through the insulating space. A coaxial flow channel around the conduits that deliver the striping material to a spray head carries heat transfer medium such as hot oil drawn from the heating fluid circulation jacket.

29 Claims, 4 Drawing Sheets

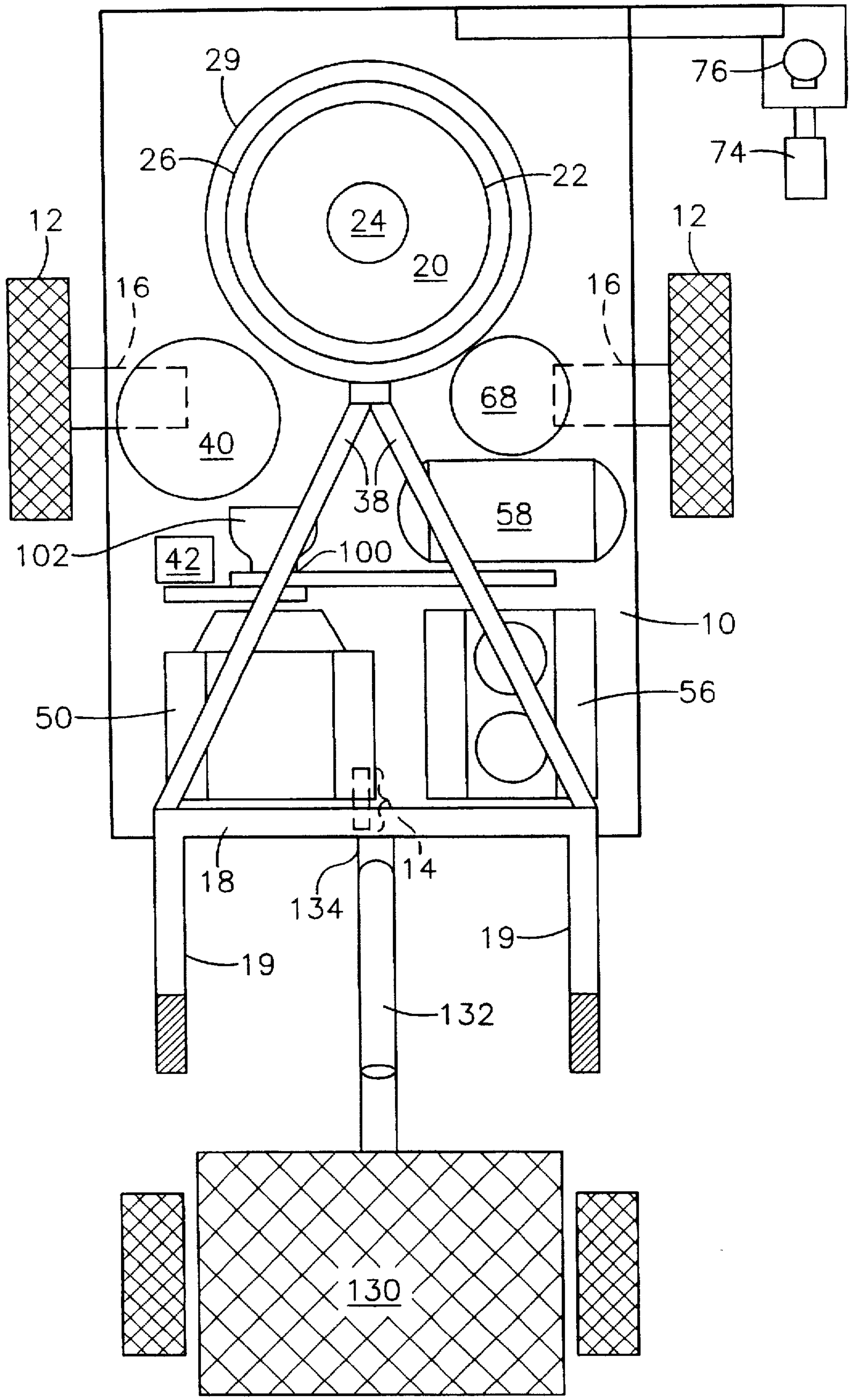
*Fig.* 1

LINE STRIPING MACHINE

BACKGROUND OF THE INVENTION

The present invention relates to specialized machinery for laying traffic safety and control lines on roads, highways and parking lots.

Road surface marking with various combinations of lines, straight and curved, continuous and dashed, has become a universal medium of traffic control and essential information. Like the road surface substrate for these lines, they are subjected to considerable wear, abuse and destructive force. Consequently, road surface line marking must be frequently revised, renewed or reconditioned.

While interstate and autobahn type highways are striped by specialized, single purpose truck machines, more detailed and densely marked roads, parking lots and industrial material aisles require smaller, more agile striping machines. Moreover, due to the great variety of surfaces, striping patterns and striping objectives, it is desirable to include in the striping equipment inventory, a machine that will apply all sorts of striping materials to a roadway.

It is an object of the present invention therefore, to provide a selfpropelled, walk-behind vehicle for applying road striping.

Another object of the invention is a selfpropelled, walk-behind controlled vehicle for heating and applying thermoplastic road striping materials.

A further object of the present invention is a walk-behind line striping machine capable of applying paints or thermoplastics.

Also an object of the present invention is a walk-behind line striping vehicle that is mobilized by hydraulic wheel motors driven by an internal combustion engine powered pump and hydraulic circulation system.

Another object of the invention is an agile, walk-behind, self-driven vehicle for applying either paint or thermoplastics and energized by a single fuel source for both heat and power systems.

SUMMARY OF THE INVENTION

These and other objects of the invention to become apparent from the following detailed description of the preferred embodiment and drawings are accomplished by a combination of compactly unitized paint striping equipment assembled on a wheel supported platform. The combination includes a material melting tank heated by a coaxially contiguous tank of heat transfer oil. A petroleum gas or oil burner beneath the heat transfer oil tank bottom heats the heat transfer oil. A dedicated pump driven by a prime mover circulates the heated oil around the melting tank and along the outer jacket of a coaxial flow tube spray head support wand. A chimney annulus surrounding the heat transfer oil tank drafts combustion products and cooling air from a burner enclosure beneath the heat transfer oil tank. The prime mover also drives a hydraulic power fluid pump and an air compressor. The pressurized hydraulic power fluid energizes independent drive motors for the platform support wheels and a melting tank agitator motor. Air pressure energizes the melted thermoplastic material flow from the melt tank and the flow of glass beads into the melted plastic or paint flow stream.

BRIEF DESCRIPTION OF THE DRAWINGS

Relative to the drawings wherein like reference characters designate like or similar elements throughout the several figures of the drawings:

FIG. 1 is a plan view of the present invention mechanical layout.

DESCRIPTION OF THE PREFERRED EMBODIMENT

Figures 2, 2A:
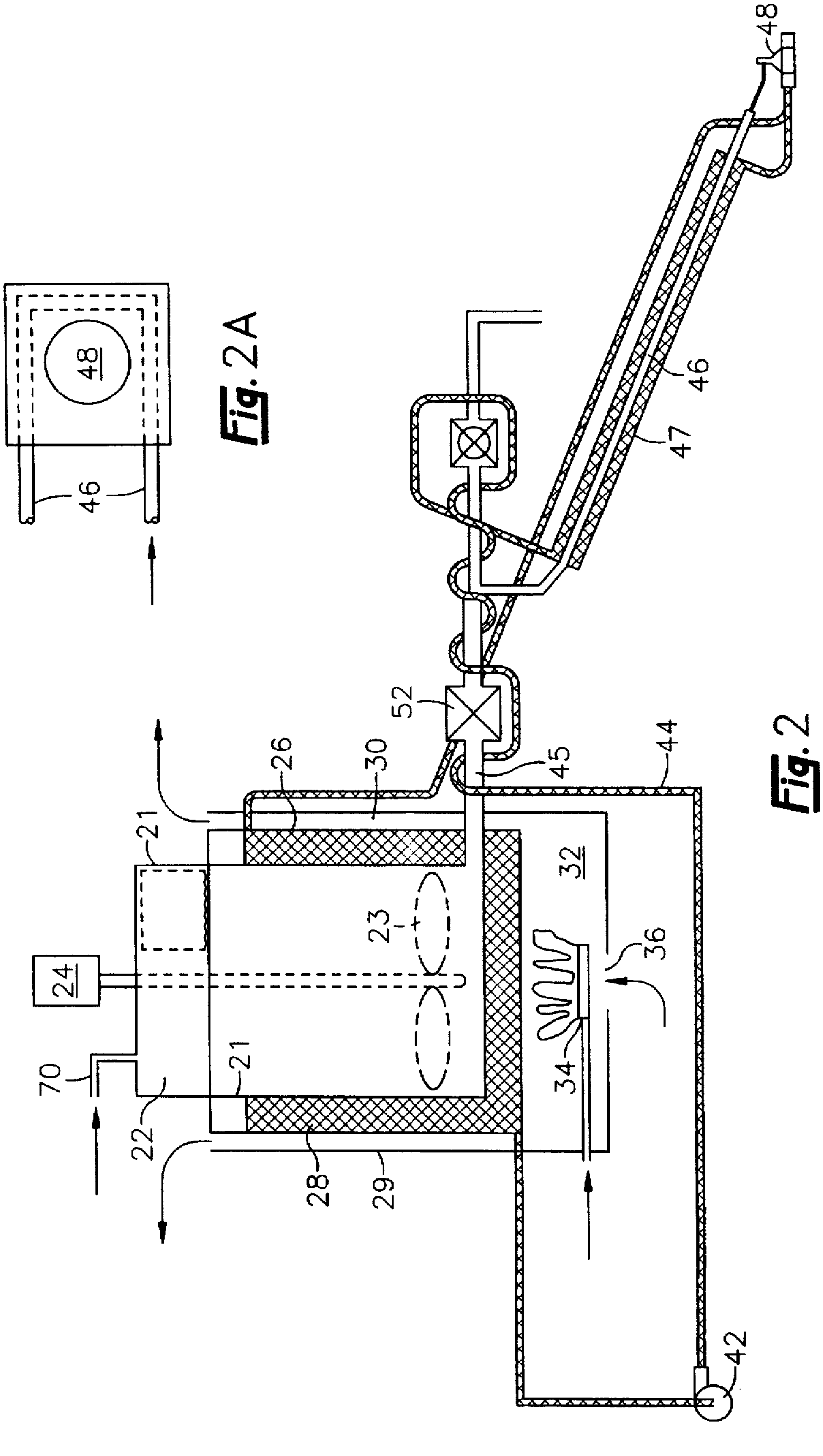
FIG. 2 is a melt oil circulation schematic for the present invention.
FIG. 2A is a plan detail of the spray gun mounting plate that carries a hot oil circulation loop.
Figure 3:
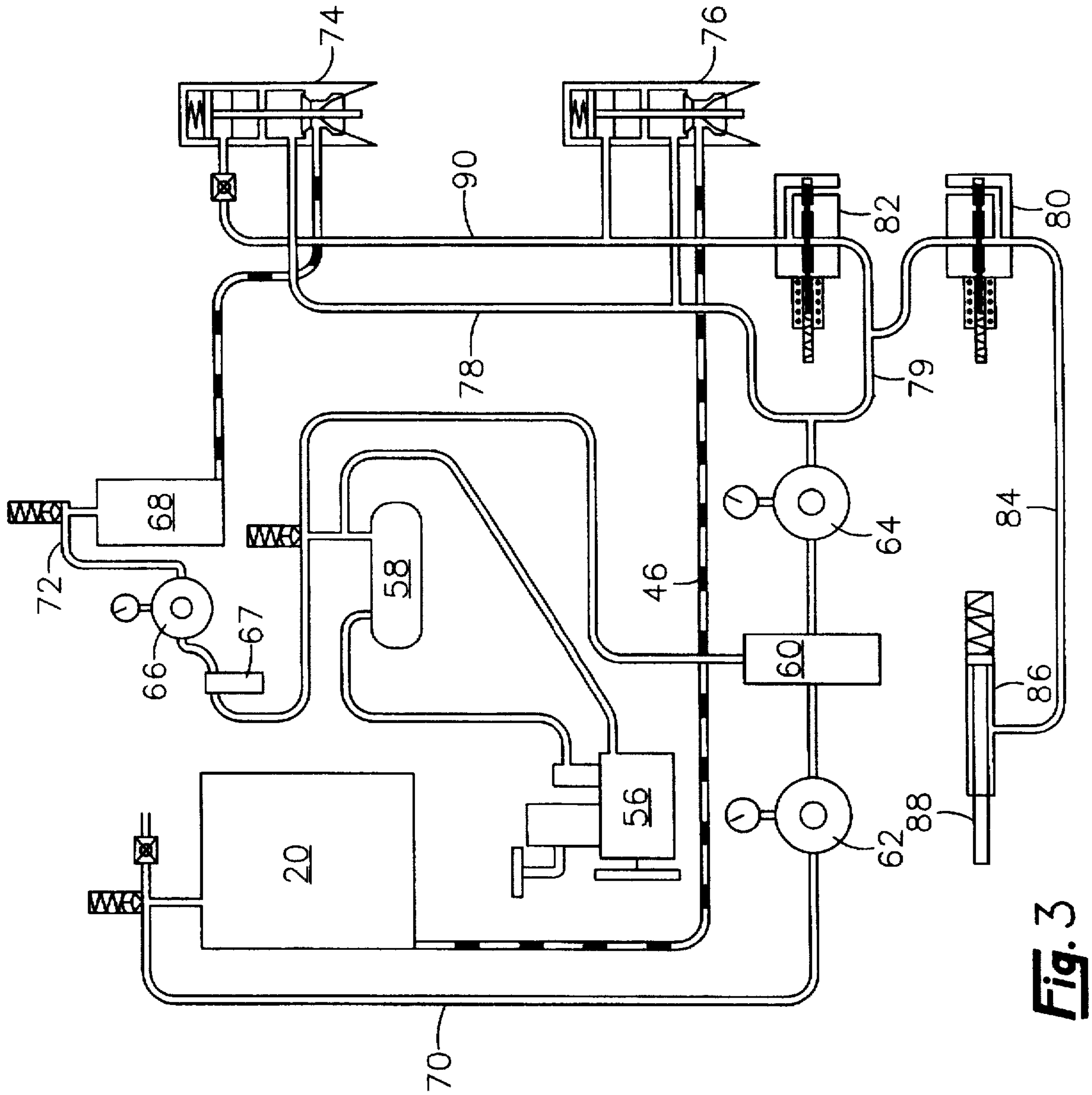
FIG. 3 is a fluid flow schematic for the pneumatic control circuit and the paint and bead delivery system.

Relative to the mechanical layout plan of FIG. 1, a traditional ladder type platform frame 10 is supported by unsprung drive wheels 12 and a single castering rear support wheel 14. Each drive wheel 12 is powered by a respective hydraulic motor 16 rigidly mounted in respective frame brackets. At the rear of the platform frame 10 is a subframe 18 having handle bars 19.

Mounted on the frame platform is a thermoplastic melt tank 20. Referring additionally to FIG. 2, melt tank 20 comprises an interior pressure tank 22 having an interior agitator 23 and an exterior agitator motor 24. The agitator drive motor 24 is hydraulically energized. In one embodiment of the pressure tank 22, the motor 24 and agitator 23 assembly are mounted on the tank lid 25 which is completely detachable from the lower, vessel portion of the tank 22. The detachable lid 25 is secured in operative position against internal pressure forces by threaded ring clamps 27. A trash screen 21 is secured to the tank 22 wall internally of the vessel to provide a final, material loading filter of contaminants that may be combined with the plastic or paint poured into the tank 22.

Surrounding the interior pressure tank 22 on the bottom and along a significant portion of the cylindrical length is an oil tank defined by a jacket wall 26 concentrically surrounding the pressure tank 22 wall at a spaced distance to an annular oil jacket volume 28. This annular volume 28 is closed at the top between the pressure tank 22 wall and the oil jacket wall 26 to provide a low pressure oil circulation zone around and below the pressure tank 22.

A third concentric cylindrical wall 29 with an integral bottom structurally encloses both, the hot oil tank 26 and the pressure tank 22 with an annular separation space 30 between the outer wall 29 and the hot oil wall 26. A lower extension of the outer wall 29 below the bottom portion of the hot oil jacket 28 volume provides a combustion chamber space 32. Within the chamber space 32 is a burner 34 for combustion of a fluid fuel such as prepare or liquified petroleum gas (LPG). Vents 36 in the combustion chamber 32 wall admit air to support the gas combustion and the chimney draft along annular space 30.

The outer wall 29 of the melt tank 20 is structurally secured to the frame 10 and also to the apex of an V truss 38. The base of the V truss is secured to the upper level of the steering subframe 18 proximate of the handle bars 19.

The frame 10 platform also supports a receiver structure for a portable propane or LPG tank to facilitate convenient removal of the tank 40 for filling and inspection but secures the tank stability and location. Gas flow from the LPG tank 40 in support of the oil jacket heating flame from burner 34 is controlled by a well known system not illustrated which includes a pressure reduction valve and a thermostatically operated flow control valve. The thermostatic valve responds to a sensor of the heat transfer oil temperature in the oil jacket 28 to maintain an oil temperature of about 350° F. to 400° F. which is about 75° F. to 125° F. above the 275° F. melting temperature of the thermoplastic striping material.

A hot oil pump 42, driven by a belt and sheave transmission from a small, 13 HP internal combustion engine 50, for example, keeps the hot oil within the jacket 28 circulating about a loop 44 that includes fluid supply conduits 46 to the spray head 48. A section of coaxial flow conduit 47 combines the oil flow loop 44 with the thermoplastic material supply conduit 46 in a heat transfer relationship to keep the plastic hot and the viscosity low as it flows from the melt tank 20 to the spray head 48. A valve 52 in the pressurized melt tank discharge pipe 45 isolates the tank interior from the delivery conduit 46 to facilitate cleaning and system repairs. Similarly, drain valve 54 below the conduit 46 junction with the tank valve 52 facilitates cleaning of the equipment.

For simplified logistics, the engine 50 is also fueled by propane or LPG from the same tank source 40 as supplies the melt tank burner 34.

Also driven by the engine 50 is a two-stage compressor 56 which supplies a pressure regulated, 26 $ft^3$ air receiver tank 58 and a pressure balancing manifold 60 with pressurized air. A receiver tank 58 reduces pressure variations and system pulsations. This facilitates control of the liquid striping material discharge spray. Regulators 62, 64 and 66 reduce the air pressure from the receiver tank and manifold pressure to a level appropriate for respective appliances. In the case of the thermoplastic material melt tank 20, regulator 62 is set to maintain a pressure of about 10 psi to about 12 psi in the tank pressure delivery line 70. Spray dispersal and control air to the spray guns 74 and 76 requires 40 psi to 50 psi from regulator 64. The pressure supply line 72 to the glass bead tank 68 is maintained at about 10 psi to 12 psi by regulator 66. Additionally, air to the bead tank 68 is passed through a dryer 67 for entrained moisture removal.

Air from the regulator 64 is divided between the spray dispersion conduit 78 and an operation control line 79 serving electrically operated solenoid valves 80 and 82. Solenoid 80 selectively supplies regulated air to the operating conduit 84 that serves the cylinder 86 for operating the caster wheel 14 pivot angle locking pin 88. Solenoid 82 selectively pressurizes conduit 90 to charge the spray gun trigger chamber and open the spray gun nozzle.

Although the frame 10 is provided with appendages 19 characterized as handlebars, direction and speed control is predominately exercised by the volume regulator 126 of pump 102 and the 3-way valve 112. The machine is turned by directing a volumetric flow difference to the wheel drive motors 16. The handlebars serve as a mounting location for the control devices convenient to a pedestrian operator.

In a closely confined operational environment requiring many reversals and short line lengths, pedestrian operation will be preferred. However, due to the capacity and versatility of the invention, long line lengths are practical tasks. In facilitation of such long and continuous applications, a surrey type of wheeled platform 130 is connected by a drawbar 132 to the frame 10 by a ball hitch 134 to support a standing operator.

Figure 4:
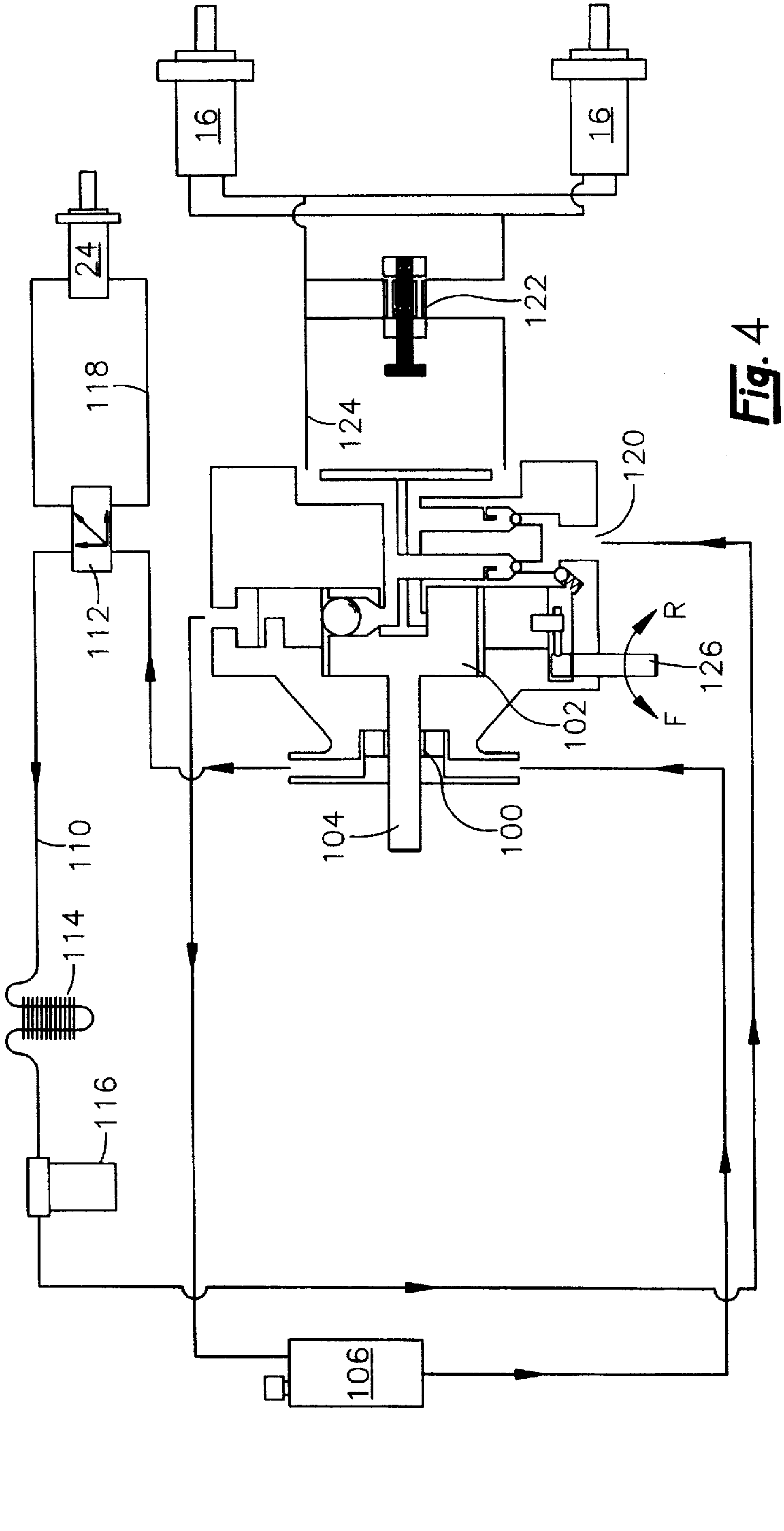
FIG. 4 is a hydraulic power and control schematic.

Referring to the hydraulic schematic of FIG. 4, the system is shown to include a traditional sliding vane pump 100 and a radial ball piston pump 102 such as the Eaton Model 11 driven by the engine 50; preferably from a common drive shaft 104. The sliding vane pump 100 supplies the agitator motor 24 circulation loop 110 through a 3-way valve 112, an oil cooler 114 and a filter 116. The 3-way valve controls the flow orientation within the drive direction subloop 118 which thereby controls the direction of motor shaft rotation. At a third position, the motor 24 may be by-passed and idled.

From the filter 116, the circulation loop enters the supply port 120 of the radial ball piston pump 102. A 3-way valve 122 in the wheel motor loop 124 allows the wheel drive to be reversed and neutraled. Discharge flow from the radial ball piston pump is delivered to an oil reservoir 106. Pump volume regulator shaft 126 controls the rotational speed of wheel motors 16.

It should be understood that melt tank 20 may be used for either thermoplastic material such as vinyl or traditional paint, whether solvent or water based. Normally, the hot oil system would not be energized for paint striping except, perhaps in extremely cold climates and then at a reduced oil temperature. Omission of the melt tank heating function has no adverse consequence on the paint delivery system from the cold melt tanks.

Having fully described my invention, those of ordinary skill will perceive those alternatives and equivalents as may be used and practiced therewith. For example, it will be noted that the melt tank 20 air pressure drive may be omitted by connecting the tank with a gravity drain into a pump suction whereby paint or hot thermoplastic striping material is drawn from the melt tank only by a gravity feed and the pump suction and delivered by the pump with a positive pressure into spray gun 76. However, it is nevertheless preferred that the striping material, whether paint or thermoplastic, is dispersed from the gun 76 by air flow.

Another alternative of the present invention may include other fuels for the melt tank burner 34 and the engine 50. For example, diesel fuel corresponds directly to No. 1 heating oil and usually may be used interchangeably. Accordingly an oil fueled burner 34 may be combined with a diesel engine 50 with both engine and heating appliance supplied from the same, unpressurized, liquid fuel tank 40.

As my invention, therefore,

We claim:

1. An apparatus for applying thermoplastic coating material to a road surface comprising:

a first storage tank having an enclosure for receiving and holding a volume of thermoplastic coating material;

a coating material delivery conduit for providing flow communication of said thermoplastic coating material from said first storage tank to a first distribution discharge appliance to apply the coating material to said surface;

a heat transfer fluid jacket substantially and contiguously surrounding said first storage tank for receiving and holding a volume of heat transfer fluid;

a heating gas flow space substantially and contiguously surrounding said heat transfer fluid jacket for raising the temperature of said heat transfer fluid in said fluid jacket substantially above ambient; and, a heat transfer fluid circulation conduit for delivering heated heat transfer fluid from said fluid jacket into heat transfer relationship with coating material in said delivery conduit between said first storage tank and said discharge appliance.

2. An apparatus as described by claim 1 wherein said first storage tank comprises a pressurized enclosure for holding a volume of said liquid coating material under a predetermined superatmospheric pressure.

3. An apparatus as described by claim 1 wherein said first storage tank comprises an unpressurized tank for holding a volume of said liquid coating material under substantially atmospheric pressure and said delivery conduit delivers the coating material to said discharge appliance under a direct pump pressure.

4. An apparatus as described by claim 1 wherein said heat transfer fluid jacket is a substantially annular volume contiguously surrounding said first storage tank.

5. An apparatus as described by claim 4 wherein a heating gas flow in said gas flow space is produced by a combustion appliance.

6. An apparatus as described by claim 5 wherein said first storage tank has a first containment wall and said heat transfer fluid jacket has a second containment wall, said second containment wall being positioned to substantially enclose said first containment wall and provide a separation volume therebetween whereby said heat transfer fluid is in simultaneous contact with both walls.

7. An apparatus as described by claim 6 wherein said heating gas flow space comprises a third containment wall surrounding said second containment wall with a separation space therebetween whereby a combustion product gas flow is channeled through said separation space.

8. An apparatus as described by claim 1 wherein said first distribution discharge appliance is a fluid spray head.

9. An apparatus as described by claim 1 further comprising a bead storage tank-having a pressurized enclosure for receiving and holding a volume of reflective bead material under a predetermined superatmospheric pressure and, a bead delivery conduit for providing flow communication of said bead material from said bead storage tank to a second distribution discharge appliance for discharging said bead material.

10. An apparatus as describe by claim 9 wherein said second discharge distribution appliance is based spray head.

11. An apparatus as described by claim 1 wherein the apparatus further comprises a plurality of independent wheels on laterally opposite sides of said apparatus for mobile support.

12. An apparatus as described by claim 11 wherein at least one of said wheels on each of laterally opposite sides of said apparatus is driven by a hydraulic motor, said hydraulic motors being energized by a hydraulic fluid circulation pump.

13. An apparatus as described by claim 12 wherein said hydraulic fluid circulation pump is driven by an internal combustion engine, said coating material heat source and said internal combustion engine are energized by the same fuel.

14. An apparatus as described by claim 13 wherein said fuel is gaseous.

15. An apparatus as described by claim 13 wherein said fuel is liquid.

16. A wheeled vehicle comprising:

a wheel supported frame structure, having at least one wheel driven by a hydraulic power transmission system;

a liquid storage vessel supported by said frame structure for containing thermoplastic coating material;

a heat transfer fluid circulation jacket substantially surrounding said liquid storage vessel;

a combustion gas flow volume substantially surrounding said fluid circulation jacket;

a coating material delivery conduit for providing flow communication of thermoplastic coating material from said liquid storage vessel to a fluid spray discharge appliance;

an adjustably positioned bracket for supporting said discharge appliance from said frame structure above and proximate of a road surface;

a heat transfer fluid circulation system for circulating heat transfer fluid from said fluid circulation jacket through a heat transfer conduit substantially surrounding said coating material delivery conduit between said liquid storage vessel and said discharge appliance; and a combustion appliance source of combustion gas positioned and arranged for heating heat transfer fluid within said fluid circulation jacket.

17. A wheeled vehicle as described by claim 16 wherein said at least one wheel further comprises a pair of wheels disposed on laterally opposite sides of said frame and each wheel of said pair of wheels is driven by a respective hydraulic motor and control therefor.

18. A wheeled vehicle as described by claim 17 wherein said vehicle is differentially steered by a pair of hydraulically driven wheels.

19. A wheeled vehicle as described by claim 18 wherein differential steering of said vehicle is manually controlled from a surrey drawn by said wheeled vehicle.

20. A wheeled vehicle as described by claim 16 wherein said hydraulic power transmission system comprises a hydraulic pump driven by an internal combustion engine.

21. A wheeled vehicle as described by claim 20 wherein the combustion appliance source of combustion gas for heating said heat transfer fluid and said internal combustion engine are energized by the same fuel.

22. A wheeled vehicle as described by claim 21 wherein said fuel is gaseous.

23. A wheeled vehicle as described by claim 21 wherein said fuel is liquid.

24. A wheeled vehicle as described by claim 16 wherein an outer wall perimeter of said combustion gas flow volume is structurally secured to said frame structure.

25. A wheel vehicle as described by claim 24 wherein said combustion gas flow volume comprises a heat riser space between said fluid circulation jacket and said outer wall perimeter.

26. A wheeled vehicle as described by claim 16 wherein said combustion gas flow volume comprises a heat riser space between said fluid circulation jacket and an outer wall around said circulation jacket.

27. A wheeled vehicle as described by claim 16 further comprising a pressurized reflective bead vessel supported by said frame structure and a bead delivery conduit for providing a flow of beads from said bead vessel to a bead spray discharge appliance.

28. A wheeled vehicle as described by claim 16 wherein said liquid storage vessel is pressurized to drive thermoplastic coating material stored therein through said delivery conduit to said fluid spray discharge appliance.

29. A wheeled vehicle as described by claim 16 wherein said coating material delivery conduit comprises a pump to draw liquid coating material from an unpressurized liquid storage vessel and drive said coating material under pressure to said spray discharge device.

* * * * *

UNITED STATES PATENT AND TRADEMARK OFFICE

CERTIFICATE OF CORRECTION

PATENT NO. : 5,785,760

DATED : July 28, 1998

INVENTOR(S) : John Ross Sconyers; Robert A. Mallory, Jr.

It is certified that error appears in the above-identified patent and that said Letters Patent is hereby corrected as shown below:

Column 2, line 50, following "fluid fuel such as", delete "prepare" and insert -- propane -- therefor.
Column 2 , line 55, following "to the apex of", delete "an" and insert -- a -- therefor.
Column 4, line 63, (claim 2) delete "liquid".
Column 5, line 1, (claim 3) delete "liquid".
Column 5, line 34, (claim 10) following "distribution appliance is", delete "based" and insert -- a bead -- therefor.
Column 6, line 56, (claim 29) following "draw", delete "liquid" and insert -- thermoplastic -- therefor.
Column 6, line 58, (claim 29) following "spray discharge", delete "device" and insert -- appliance -- therefor.

Signed and Sealed this

Third Day of November, 1998

Attest:

Bruce Lehman

BRUCE LEHMAN

*Attesting Officer* *Commissioner of Patents and Trademarks*